United States Patent
Kim et al.

(10) Patent No.: US 8,203,599 B2
(45) Date of Patent: Jun. 19, 2012

(54) 3D IMAGE DISPLAY APPARATUS AND METHOD USING DETECTED EYE INFORMATION

(75) Inventors: Tae-hee Kim, Suwon-si (KR); Dae-sik Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1546 days.

(21) Appl. No.: 11/698,220

(22) Filed: Jan. 26, 2007

(65) Prior Publication Data

US 2007/0171276 A1   Jul. 26, 2007

(30) Foreign Application Priority Data

Jan. 26, 2006  (KR) .................... 10-2006-0008290

(51) Int. Cl.
*H04N 13/04* (2006.01)
(52) U.S. Cl. ........................................ 348/51
(58) Field of Classification Search .......... 348/51, 348/78
See application file for complete search history.

(56) References Cited

U.S. PATENT DOCUMENTS

2006/0038880 A1\* 2/2006 Starkweather et al. ......... 348/51

FOREIGN PATENT DOCUMENTS

| JP | 07-061256 A  | 3/1995  |
|----|--------------|---------|
| JP | 09-168170 A  | 6/1997  |
| JP | 09-185015 A  | 7/1997  |
| JP | 11-295637 A  | 10/1999 |

\* cited by examiner

*Primary Examiner* — Ario Etienne
*Assistant Examiner* — Hee Kim
(74) *Attorney, Agent, or Firm* — Sughrue Mion, PLLC

(57) ABSTRACT

Provided is a three-dimensional (3D) image display apparatus and method including: a display; a photographing unit including a camera, a first light source disposed on an axis identical to a camera axis and a second light source disposed on an axis different from the camera axis, which takes a photograph of an observer using light emitted from the first and second light sources, and generates first and second images; an eye information detection unit which detects eye information of the observer based on the first and second images and determines a position of the observer based on the detected eye information; and a 3D image adjustment unit which adjusts a 3D image, which will be displayed on the display, based on the determined position of the observer.

21 Claims, 10 Drawing Sheets

3D IMAGE DISPLAY APPARATUS AND METHOD USING DETECTED EYE INFORMATION

CROSS-REFERENCE TO RELATED PATENT APPLICATIONS

This application claims the priority of Korean Patent Application No. 10-2006-0008290, filed on Jan. 26, 2006, in the Korean Intellectual Property Office, the disclosure of which is incorporated herein in its entirety by reference.

BACKGROUND OF THE INVENTION

1. Field of the Invention

Apparatuses and methods consistent with the present invention relate to a three-dimensional (3D) image display, and more particularly, to a 3D image display which can detect eye information of an observer using two light sources and a differential image, adaptively display a 3D image using the detected eye information even when the observer moves, and reflect a degree of fatigue of the observer in displaying the 3D image.

2. Description of the Related Art

Three-dimensional (3D) images are created based on the principle of stereovision through two human eyes. Binocular parallax which occurs since human eyes are located approximately 65 mm apart from each other is an important factor contributing to a 3D effect. 3D image displays are classified as displays requiring glasses or displays without glasses. Displays without glasses obtain a 3D image by separating left/right images without using glasses. Displays without glasses may be classified as parallax barrier type displays or lenticular type displays.

Figure 1:
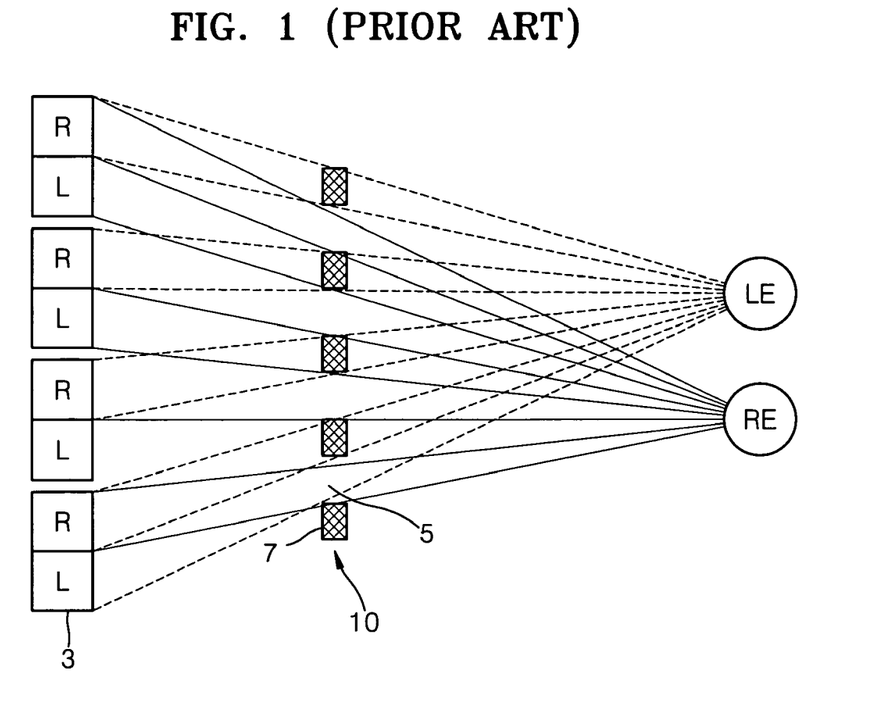
FIG. 1 is a schematic view of a conventional 3D image display apparatus using a parallax barrier type display.

For example, according to the parallax barrier type display illustrated in FIG. 1, a parallax barrier 10 having a vertical-latticed-shaped opening 5 and a mask 7 is disposed in front of a liquid crystal panel 3 which has left-eye image information L and right-eye image information R, respectively corresponding to a left eye LE and a right eye RE of an observer. An image is separated through the openings of the parallax barrier 10. The left-eye image information L to be input to the left eye LE of the observer and the right-eye image information R to be input to the right eye RE of the observer are alternately arranged on the liquid crystal panel 3.

The left-eye image information L for the left eye LE of the observer and the right-eye image information R for the right eye RE of the observer are input, respectively, to the left eye LE and the right eye RE so that the observer can properly perceive a 3D image. However, if the left-eye image information L and the right-eye image information R are not properly input to the left eye LE and the right eye RE, respectively, after the head of the observer is moved, the observer cannot perceive the 3D image.

SUMMARY OF THE INVENTION

The present invention provides a three-dimensional (3D) image display apparatus and method which can adaptively display a 3D image even when the position of the head of an observer changes.

The present invention also provides a 3D image display apparatus and method which can reduce a degree of fatigue of an observer.

According to an aspect of the present invention, there is provided a 3D image display apparatus including: a display; a photographing unit including a camera, a first light source disposed on an axis identical to a camera axis, and a second light source disposed on an axis different from the camera axis, which takes a photograph of an observer using light emitted from the first and second light sources, and generates first and second images; an eye information detection unit which detects eye information of the observer based on the first and second images and determines a position of the observer based on the detected eye information; and a 3D image adjustment unit which adjusts a 3D image, which will be displayed on the display, based on the determined position of the observer.

The photographing unit may also include: a light source control unit which controls the first and second light sources to be alternately turned on at predetermined intervals.

Each of the first and second light sources may include an infrared generation unit.

The first light source may include a plurality of first lamps disposed around a lens of the camera, and the second light source may include a plurality of second lamps separated from the lens of the camera by a predetermined distance.

The eye information detection unit may subtract the second image from the first image, generate a differential image between the first and second images, and detect the eye information based on the differential image.

The eye information detection unit may calculate a distance by which the observer deviates from an orthoscopic position at which the observer can perceive a 3D image based on the detected eye information and determine the position of the observer based on the calculated distance, and the 3D image adjustment unit may adjust the 3D image according to the calculated distance.

The 3D image adjustment unit may include a 3D image inversion unit which inverts a 3D image for the left eye and a 3D image for the right eye which will be displayed on the display, and the eye information detection unit may control the 3D image inversion unit to invert the 3D image for the left eye and the 3D image for the right eye when the eye information detection unit determines that the observer has moved from the orthoscopic position at which the observer can perceive a 3D image by a distance proportional to a distance between the observer's eyebrows.

The 3D image adjustment unit may include a 3D optical plate driving unit which divides a 3D image into the first and second images and transmits the first and second images on different optical paths, and the eye information detection unit may control the 3D optical plate driving unit to shift the 3D optical plate when the eye information detection unit determines that the observer has moved from the orthoscopic position at which the observer can perceive a 3D image by a distance proportional to ½× an odd number of the distance between the observer's eyebrows.

The 3D optical plate driving unit may shift the 3D optical plate by 0.5 pitch.

The eye information detection unit may detect a frequency of eye blinks for a predetermined period of time, and the 3D image adjustment unit may further include a disparity adjustment unit adjusting a disparity of a 3D image based on the detected frequency of eye blinks.

The eye information detection unit may determine whether the detected frequency of eye blinks exceeds a predetermined threshold and control the disparity adjustment unit to reduce the disparity of the 3D image when the eye information detection unit determines that the detected frequency of eye blinks exceeds the predetermined threshold.

The display may include the 3D optical plate which divides the adjusted 3D image into the first and second images on different optical paths and transmits the first and second images.

The apparatus may be a digital television.

According to another embodiment of the present invention, there is provided a 3D image display method including: taking a photograph of an observer using light emitted from a first light source disposed on an axis identical to a camera axis and a second light source disposed on an axis different from the camera axis and generating first and second images; detecting eye information of the observer based on the first and second images; determining a position of the observer based on the detected eye information; adjusting a 3D image, based on the determined position of the observer; and displaying the 3D image on a display.

BRIEF DESCRIPTION OF THE DRAWINGS

The above and other aspects of the present invention will become more apparent from the following detailed description of exemplary embodiments thereof with reference to the attached drawings in which.

DETAILED DESCRIPTION OF EXEMPLARY EMBODIMENTS OF THE INVENTION

The present invention will now be described more fully with reference to the accompanying drawings, in which exemplary embodiments of the invention are shown. The invention may, however, be embodied in many different forms and should not be construed as being limited to the embodiments set forth therein; rather, these embodiments are provided so that this disclosure will be thorough and complete, and will fully convey the concept of the invention to those skilled in the art.

Figure 2:
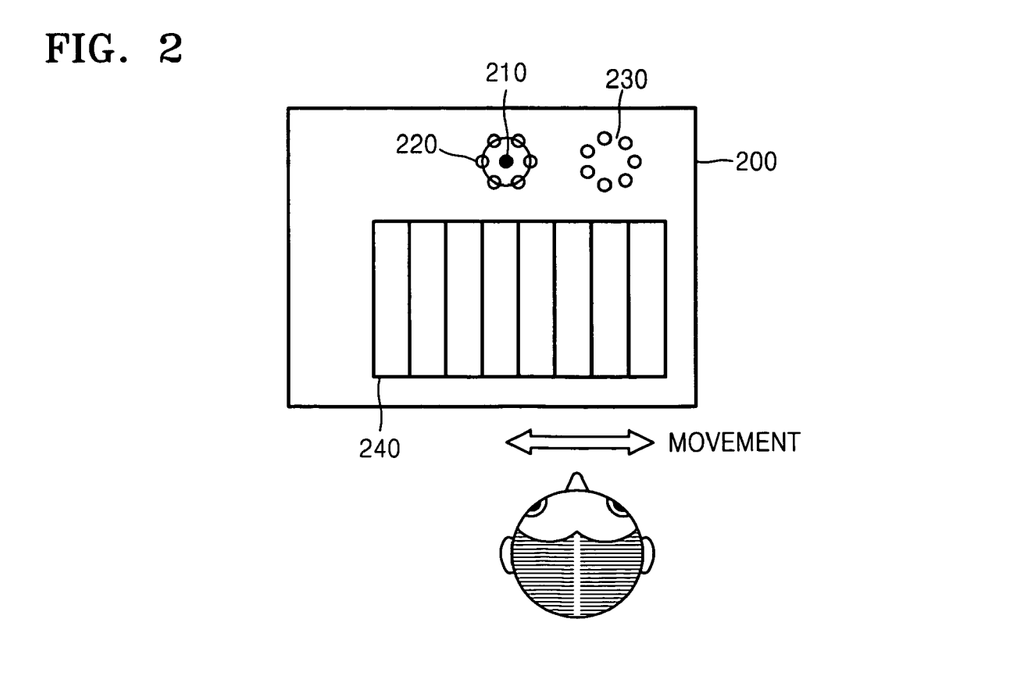
FIG. 2 illustrates a 3D image display apparatus using detected eye information according to an exemplary embodiment of the present invention.

FIG. 2 illustrates a 3D image display apparatus 200 using detected eye information according to an embodiment of the present invention. Referring to FIG. 2, the apparatus 200 includes a display unit 240 which displays a 3D image according to a display method without glasses, such as a lenticular lens display or a parallax barrier display. The apparatus 200 further includes a camera 210, a first light source 220, and a second light source 230. The apparatus 200 may be a digital television.

The first light source 220 of the apparatus 200 is disposed on an axis identical to a camera axis of the camera 210, and the second light source 230 is disposed on an axis different from the camera axis of the camera 210. The axis identical to the camera axis of the camera 210 is called an on-axis, and the axis different from the camera axis of the camera 210 is called an off-axis. The apparatus 200 takes a photograph of an observer using light emitted from the first and second light sources 220 and 230 and generates first and second images. Specifically, the apparatus 200 alternately turns on the first and second light sources 220 and 230 at predetermined intervals. The camera 210 takes a photograph of the observer using light emitted from the first and second light sources 220 and 230 which are alternately turned on and generates the first and second images. A method of detecting eye information of the observer using a differential image between the first and second images which are generated by the apparatus 200 using the first and second light sources 220 and 230 will now be described with reference to FIGS. 3A through 3E.

FIGS. 3A through 3E illustrate the method of detecting the eye information of an observer using the first and second light sources 220 and 230 and a differential image according to an embodiment of the present invention.

Figure 3A:
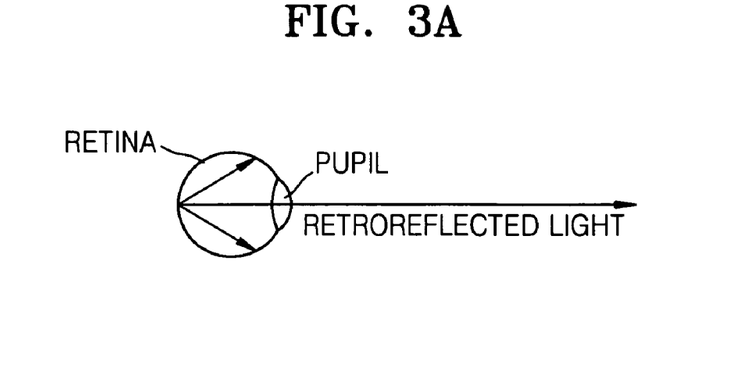
FIGS. 3A through 3E illustrate a method of detecting eye information of an observer using two light sources and a differential image according to an exemplary embodiment of the present invention.
Figure 3B:
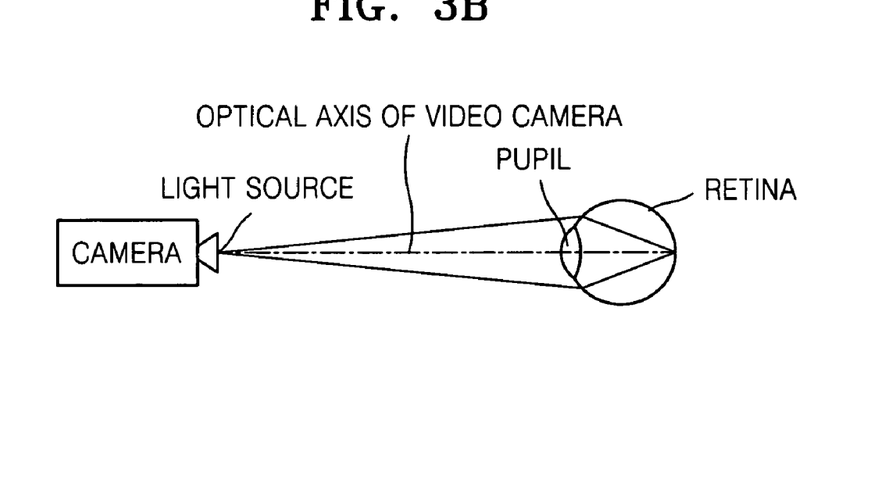
Figure 3C:
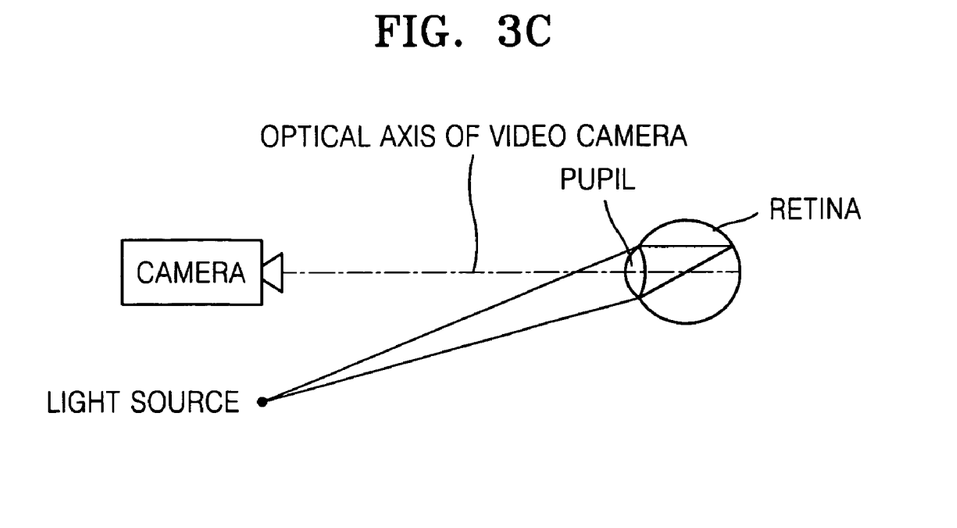

Referring to FIG. 3A, light incident to the eye of the observer passes through the pupil, reaches the retina, and then is retroreflected off the retina. When light is incident to the eye of the observer along an axis parallel to the camera axis of the camera 210 as illustrated in FIG. 3B, the light is reflected off the retina, passes the pupil, and then is emitted along the same path as an incident path. Therefore, the eye photographed by the camera 210 in FIG. 3B is bright and thus called a bright eye. However, when light is incident to the eye of the observer along an axis diagonal to the camera axis of the camera 210 as illustrated in FIG. 3C, the light reflected off the retina passes the pupil and is emitted along the slant axis. Therefore, the eye photographed by the camera 210 in FIG. 3C is dark and thus called a dark eye.

Figure 3D:
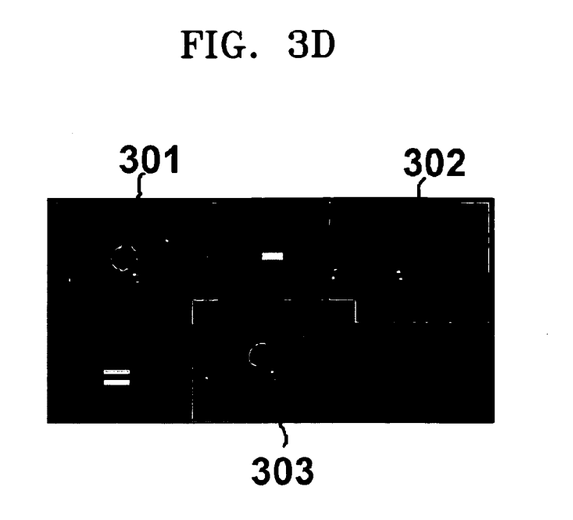
Figure 3E:
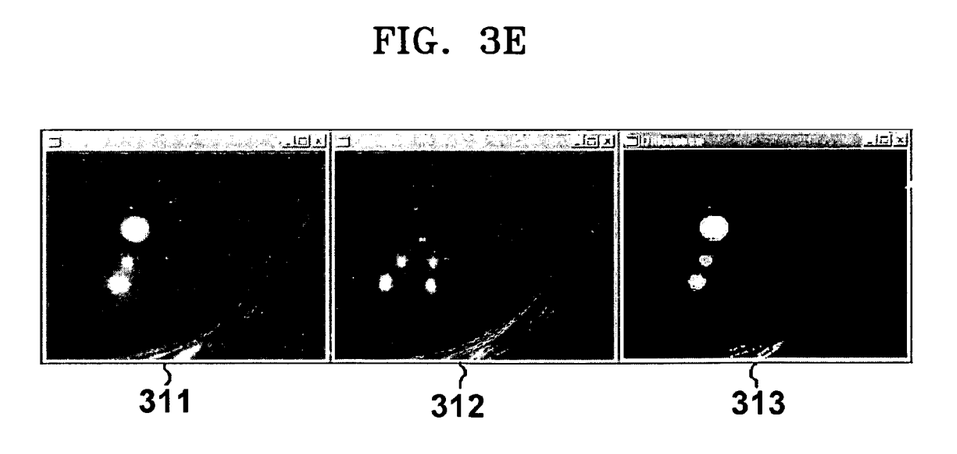

The bright eye and the dark eye are photographed as illustrated in FIG. 3D. In FIG. 3D, an image 301 indicates an image of the bright eye photographed by the camera 210, and an image 302 indicates an image of the dark eye photographed by the camera 210. An image 303 indicates a differential image between the image 301 of the bright eye and the image 302 of the dark eye. According to the method, the image of the eye can be easily detected even when the observer is wearing eyeglasses. An image 311 is an image of a bright eye of the observer wearing eyeglasses, an image 312 is an image of a dark eye of the observer, and an image 313 is a differential image between the image 311 of the bright eye and the image 312 of the dark eye.

The apparatus 200 takes a photograph of an observer using the first light source 220 and the second light source 230 at predetermined intervals, for example, 1/60 seconds. As described above, the first light source 220 is disposed on the axis identical to the camera axis of the camera 210 and used to take a photograph of a bright eye, and the second light source 230 is disposed on the axis different from the camera axis of the camera 210 and used to take a photograph of a dark eye. The first and second images photographed at intervals of 1/60 seconds are combined to complete a 3D image of one frame at intervals of 1/30 seconds.

The apparatus 200 may detect the eye information using luminance data and position data which are determined based on the differential image between the first and second images. For example, the apparatus 200 may detect the size or width of the pupil or the position of the cornea. Using the eye information thus detected, the apparatus 200 can determine the position of the observer. Various conventional methods may be used to calculate the position of the observer based on the detected eye information.

The apparatus 200 may also detect the frequency of eye blinks of the observer for a predetermined period of time using a 3D image frame completed at intervals of, for example, 1/30 seconds. This is possible since the pupils are visible in a differential image included in the 3D image frame when the observer opens his or her eyes, whereas the pupils are not visible in the differential image when the observer closes his or her eyes. As described above, the method of detecting the eye information of an observer using two light sources and a differential image and determining the position of the observer based on the detected eye information requires less calculation for determining the position of the observer than conventional methods of determining the position of an observer. In addition, the position of the observer can be more accurately determined.

Figure 4:
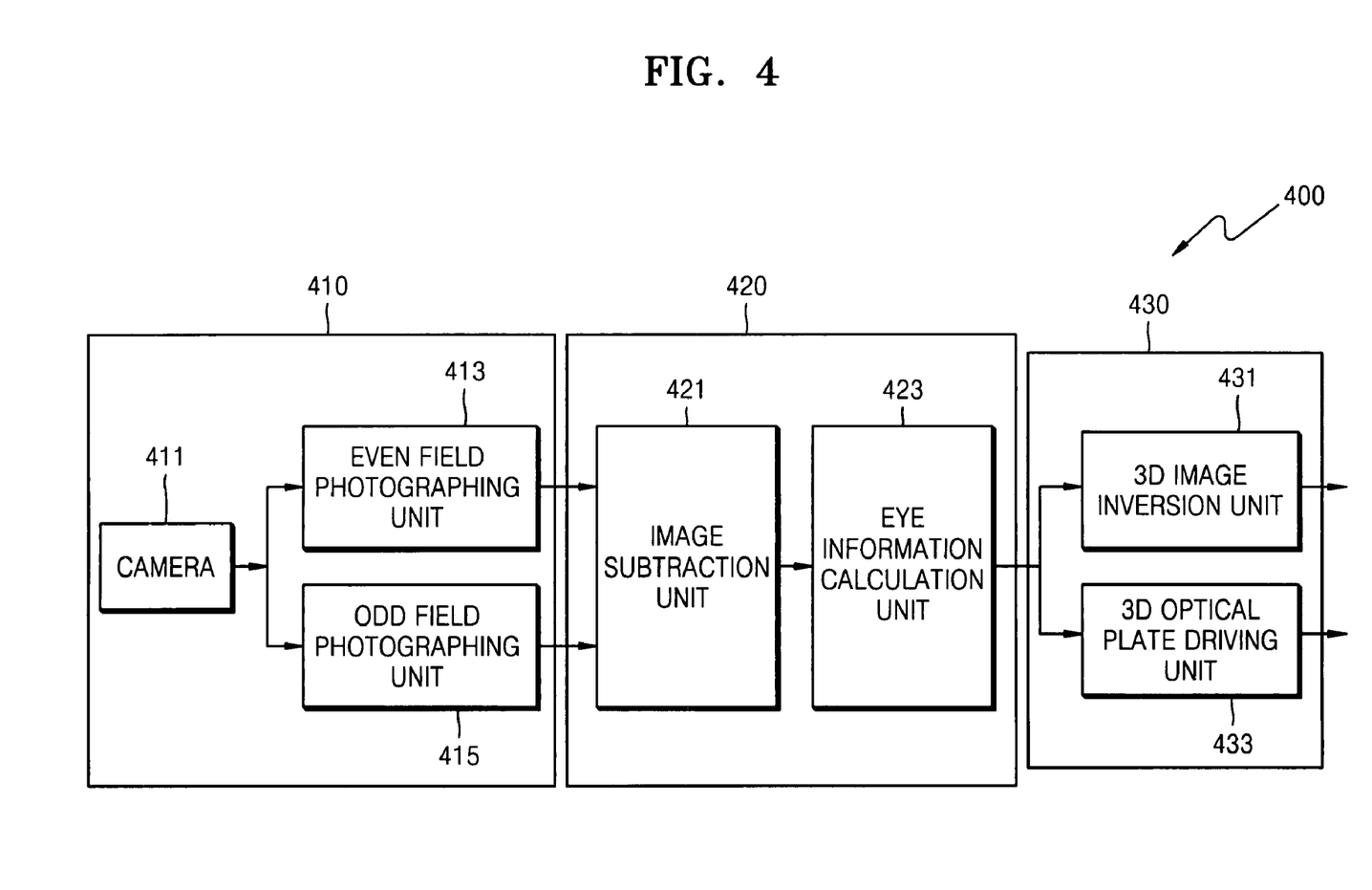
FIG. 4 is a block diagram of a 3D image display apparatus using detected eye information according to an exemplary embodiment of the present invention.

FIG. 4 is a block diagram of a 3D image display apparatus 400 using detected eye information according to an embodiment of the present invention. Referring to FIG. 4, the apparatus 400 includes a photographing unit 410, an eye information detection unit 420, and a 3D image adjustment unit 430.

The photographing unit 410 includes a camera 411, an even field photographing unit 413, and an odd field photographing unit 415. Although not shown in FIG. 4, the photographing unit 410 further includes a light source control unit, and first and second light sources. As described above, the first light source is disposed on an axis identical to a camera axis of the camera 411, and the second light source is disposed on an axis different from the camera axis. The light source control unit controls the first and second light sources to be alternately turned on at predetermined intervals, for example, at intervals of 1/60 seconds or 1/120 seconds.

The photographing unit 410 takes a photograph of an observer using light emitted from the first and second light sources alternately turned on and generates first and second images. The even field photographing unit 413 takes a photograph of the observer when the first light source on the on-axis is on and the second light source on the off-axis is off. The odd field photographing unit 415 takes a photograph of the observer when the first light source on the on-axis is off and the second light source on the off-axis is off.

Since the first and second light sources respectively include infrared generation units, they can radiate infrared rays. The first light source includes a plurality of first lamps disposed around a camera lens in a circle and on the same axis as the camera axis. The second light source includes a plurality of second lamps separated from the camera lens by a predetermined distance.

The eye information detection unit 420 detects the eye information of the observer based on the first and second images. An image subtraction unit 421 included in the eye information detection unit 420 subtracts the second image from the first image and generates a differential image between the first and second images. An eye information calculation unit 423 included in the eye information detection unit 420 detects the eye information from the differential image. In addition, the eye information calculation unit 423 can calculate the position of the observer based on the detected eye information. When determining the position of the observer, the eye information calculation unit 423 can calculate the distance by which the observer deviates from an orthoscopic position at which the observer can properly perceive a 3D image. Therefore, the eye information calculation unit 423 can control the operation of the 3D image adjustment unit 430 according to the distance by which the observer deviates from the orthoscopic position at which the observer can properly perceive the 3D image.

The 3D image adjustment unit 430 adjusts a 3D image to be displayed on a display based on the determined position of the observer. The 3D image adjustment unit 430 includes a 3D image inversion unit 431 and a 3D optical plate driving unit 433.

The 3D image inversion unit 431 can invert a 3D image for the left eye and a 3D image for the right eye, which will be displayed on the display. The 3D optical plate driving unit 433 can shift a 3D optical plate which divides a 3D image into the first and second images on different optical paths and transmits the first and second images accordingly. A method of adjusting a 3D image according to the distance by which an observer deviates from the orthoscopic position at which the observer can properly perceive the 3D image will now be described with reference to FIGS. 5A through 6B.

Figure 5A:
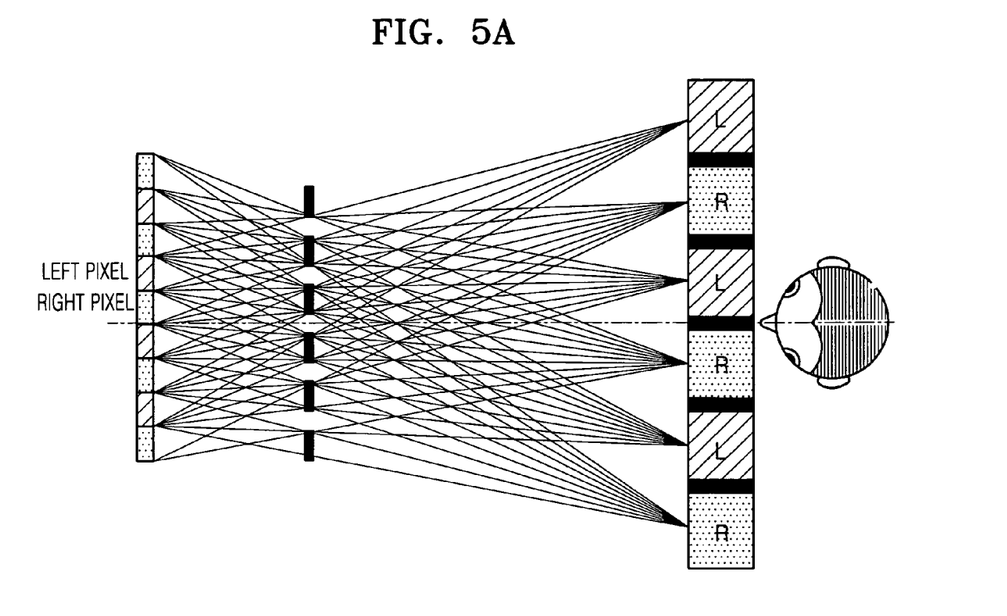
FIGS. 5A and 5B illustrate a case where an observer moved far away from an orthoscopic position at which the observer can properly perceive a 3D image.
Figure 5B:
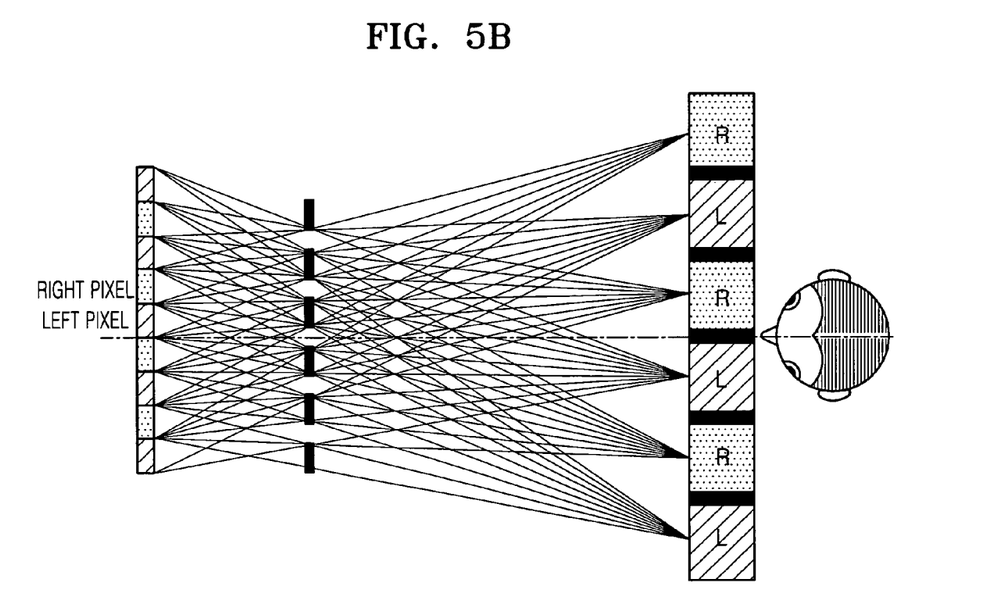

FIG. 5A illustrates a case where an observer moved far away, for example, 6.5 cm corresponding to the distance between the observer's eyebrows, from the orthoscopic position at which the observer can properly perceive a 3D image. In this case, due to the movement of the observer, a 3D image for the left eye is input to the right eye of the observer, and a 3D image for the right eye is input to the left eye of the observer. Consequently, the observer cannot perceive the 3D images. When the 3D image for the left eye and the 3D image for the right eye, which will be displayed on the display, are inverted and thus the 3D image for the right eye is input to the right eye of the observer and the 3D image for the left eye is input to the left eye of the observer as illustrated in FIG. 5B, the observer can observe the 3D images.

Figure 6A:
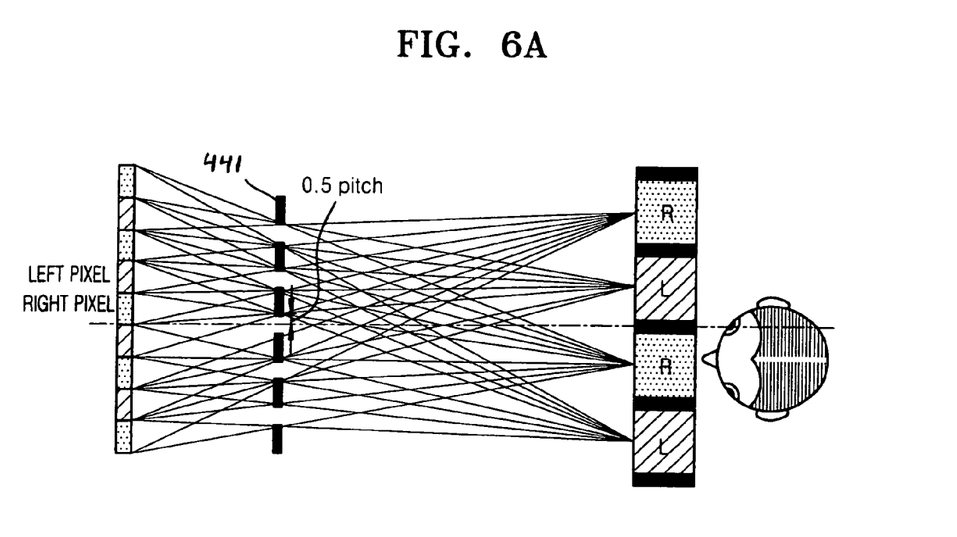
FIGS. 6A and 6B illustrate a case where an observer moved a little from the orthoscopic position at which the observer can properly perceive a 3D image.
Figure 6B:
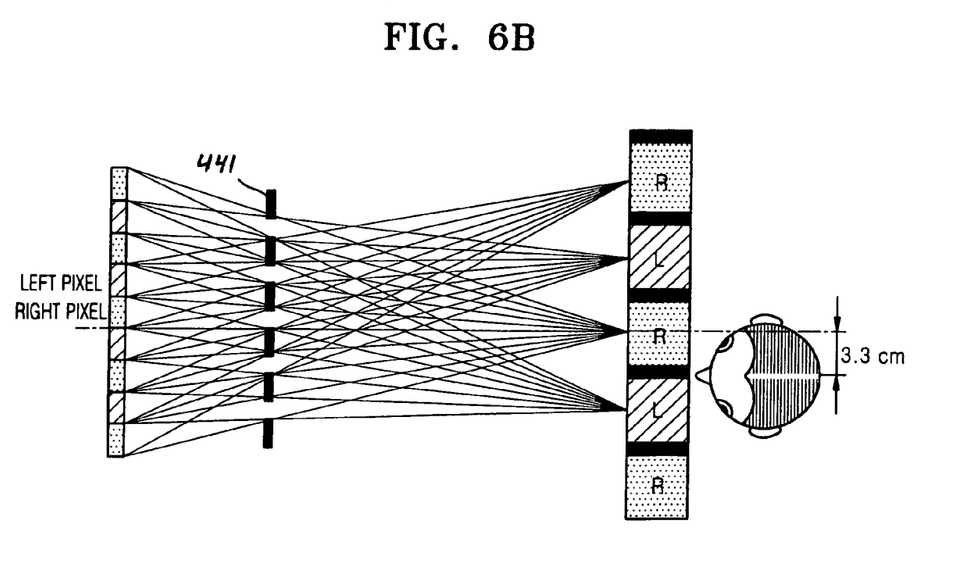

FIG. 6A illustrates a case where an observer moved a little, for example, 3.3 cm corresponding to half the distance between the observer's eye brows, from the orthoscopic position at which the observer can properly perceive a 3D image. In this case, the observer is positioned near an edge of a 3D window as illustrated in FIG. 6A. Since cross-talk increases from the middle of the 3D window to the edge thereof, the observer near the edge of the 3D image cannot observe a clear 3D image. In this case, if the 3D optical plate 441 is shifted by 0.5 pitch as illustrated in FIG. 6B, the observer can observe a clear 3D image. The description of the present invention has been made based on a barrier-type optical plate. However, the same applies to an optical plate using a cylinder lens.

Referring back to FIG. 4, when the eye information calculation unit 423 of the eye information detection unit 420 determines that the observer has moved from the orthoscopic position at which the observer can perceive a 3D image by the distance proportional to the distance between the observer's eye brows, the eye information detection unit 420 controls the 3D image inversion unit 431 to invert the 3D image for the left eye and the 3D image for the right eye, which will be displayed on the display. When the eye information detection unit 420 determines that the observer has moved from the orthoscopic position by a distance proportional to $\frac{1}{2} \times n$ (n is a natural odd number) of the distance between the observer's eye brows, the eye information detection unit 420 controls the 3D optical plate driving unit 433 to shift the 3D optical plate 441 which divides a 3D image into first and second images on different optical paths and transmit the first and second images accordingly. The 3D optical plate driving unit 433 may be a servo motor. The 3D optical plate driving unit 433 can adjust a 3D image by shifting the 3D optical plate 441 by 0.5 pitch as illustrated in FIGS. 6A and 6B.

Figure 7:
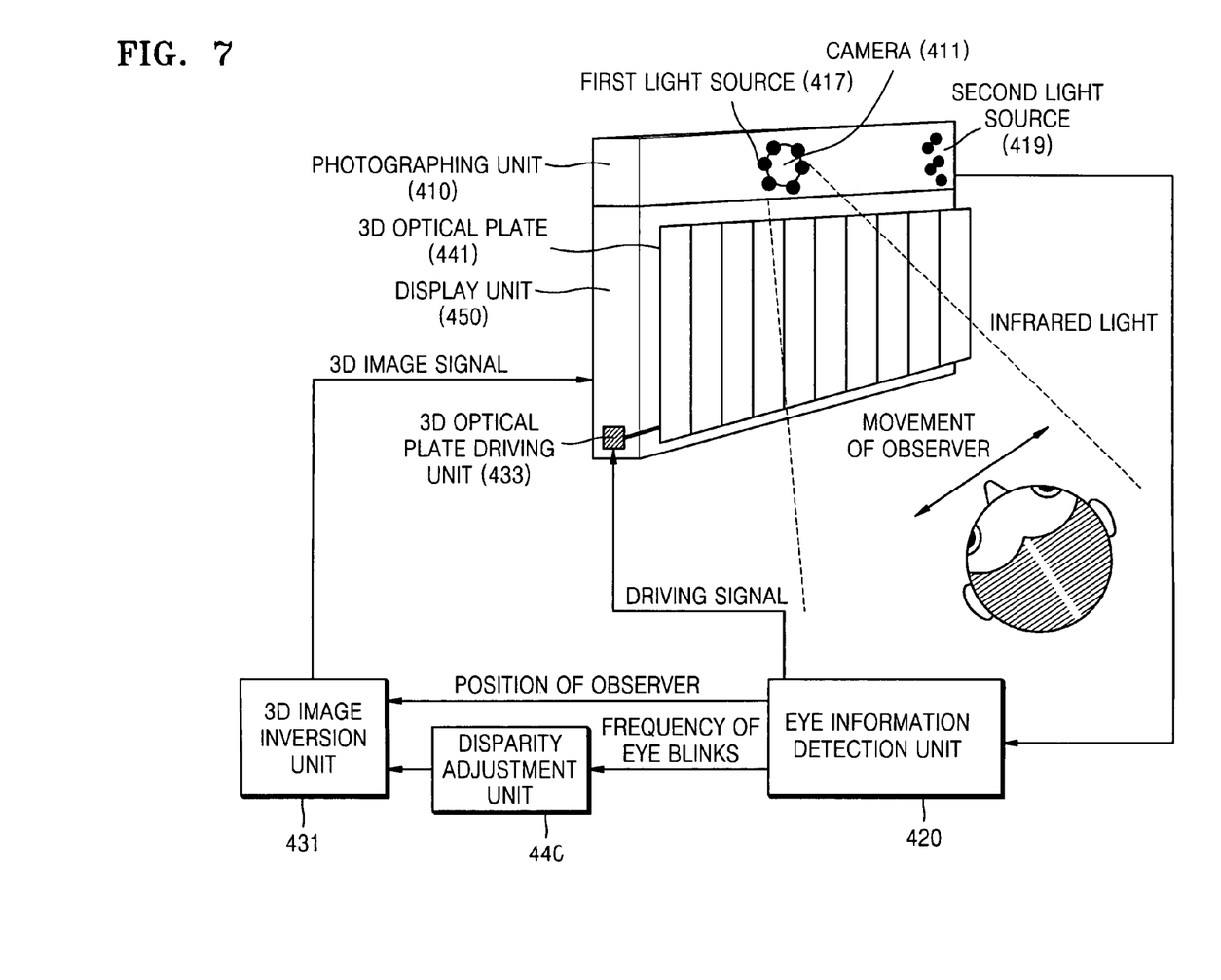
FIG. 7 illustrates a 3D image display apparatus using detected eye information according to another exemplary embodiment of the present invention.

FIG. 7 illustrates a 3D image display apparatus using detected eye information according to another embodiment of the present invention. The apparatus of FIG. 7 includes a disparity adjustment unit 440 in addition to the apparatus 400 of FIG. 4 to detect a degree of fatigue of an observer and adjust a disparity of a 3D image. An eye information detection unit 420 included in the apparatus of FIG. 7 detects the frequency of eye blinks of the observer to detect the degree of fatigue and controls the disparity adjustment unit 440 to adjust the disparity of the 3D image based on the detected frequency of eye blinks. The correlation between the degree of fatigue and the frequency of eye blinks will now be described with reference to FIG. 8.

Figure 8:
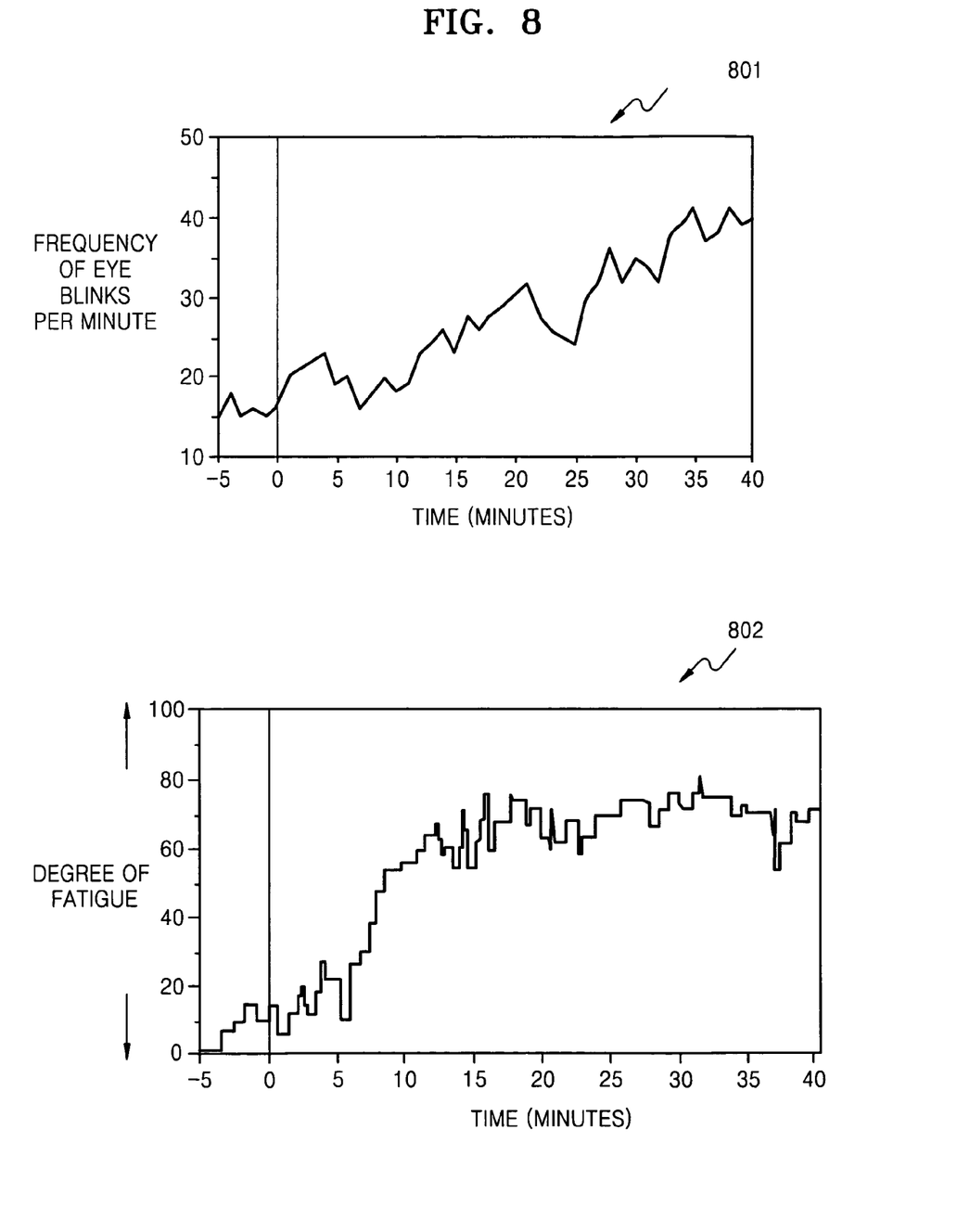
FIG. 8 illustrates graphs showing the correlation between a degree of fatigue and the frequency of eye blinks.

FIG. 8 illustrates graphs 801 and 802 showing the correlation between the degree of fatigue and the frequency of eye blinks. Human eyes blink 10 to 15 times per minute to maintain humidity of the cornea and supply oxygen. The graph 801 illustrates variations in the frequency of eye blinks obtained after the frequency with which a subject watching television blinks per minute is measured for 40 minutes. The graph 802 illustrates the degree of fatigue of the subject measured for the 40 minutes during which the frequency of eye blinks of the observer illustrated on the graph 801 is measured. Referring to the graphs 801 and 802, there is a correlation between the degree of fatigue and the frequency of eye blinks. Therefore, when the frequency of eye blinks exceeds a predetermined threshold experimentally determined, it can be understood that the observer feels fatigue. In this case, the degree of fatigue of the observer can be decreased by reducing the disparity of a 3D image. In detail, when the disparity of the 3D image is reduced, a depth of the 3D image is also reduced, which results in a reduction in the degree of fatigue of the observer.

Referring back to FIG. 7, the photographing unit 410 takes a photograph of the observer using light alternately emitted from a first light source 417 disposed on an axis identical to the camera axis and a second light source 419 disposed on an axis different from the camera axis under the control of a light source control unit (not shown) and generates first and second images. The eye information detection unit 420 detects eye information of the observer based on the first and second images and determines the position of the observer based on the detected eye information. The eye information detection unit 420 may subtract the second image from the first image, generate a differential image between the first and second images, and detect eye information from the differential image. In addition, the eye information detection unit 420 may calculate the distance by which the observer deviates from the orthoscopic position at which the observer can perceive a 3D image based on the detected eye information and determine the position of the observer.

When the eye information detection unit 420 determines that the observer has moved from the orthoscopic position at which the observer can perceive a 3D image by a distance proportional to the distance between the observer's eye brows, the eye information detection unit 420 controls the 3D image inversion unit 431 to invert the 3D image for the left eye and the 3D image for the right eye, which will be displayed on the display. When the eye information detection unit 420 determines that the observer has moved from the orthoscopic position by a distance proportional to ½×n (n is a natural odd number) of the distance between the observer's eye brows, the eye information detection unit 420 controls the 3D optical plate driving unit 433 to shift the 3D optical plate 441 using a driving signal. The 3D optical plate driving unit 433 may shift the 3D optical plate 441 by 0.5 pitch.

The eye information detection unit 420 detects the frequency of eye blinks of the observer for a predetermined period of time, and the disparity adjustment unit 440 adjusts a disparity of a 3D image based on the detected frequency of eye blinks. The eye information detection unit 420 determines whether the detected frequency of eye blinks exceeds a predetermined threshold. When the eye information detection unit 420 determines that the detected frequency of eye blinks exceeds the predetermined threshold, the eye information detection unit 420 controls the disparity adjustment unit 440 to reduce the disparity of the 3D image.

The display unit 450 gives directionality to a left-eye image signal and a right-eye image signal using the 3D optical plate 441, such as a lenticular lens or a parallax barrier, such that a 3D image for the left eye and a 3D image for the right eye are input respectively to the left eye and right eye of the observer.

Figure 9:
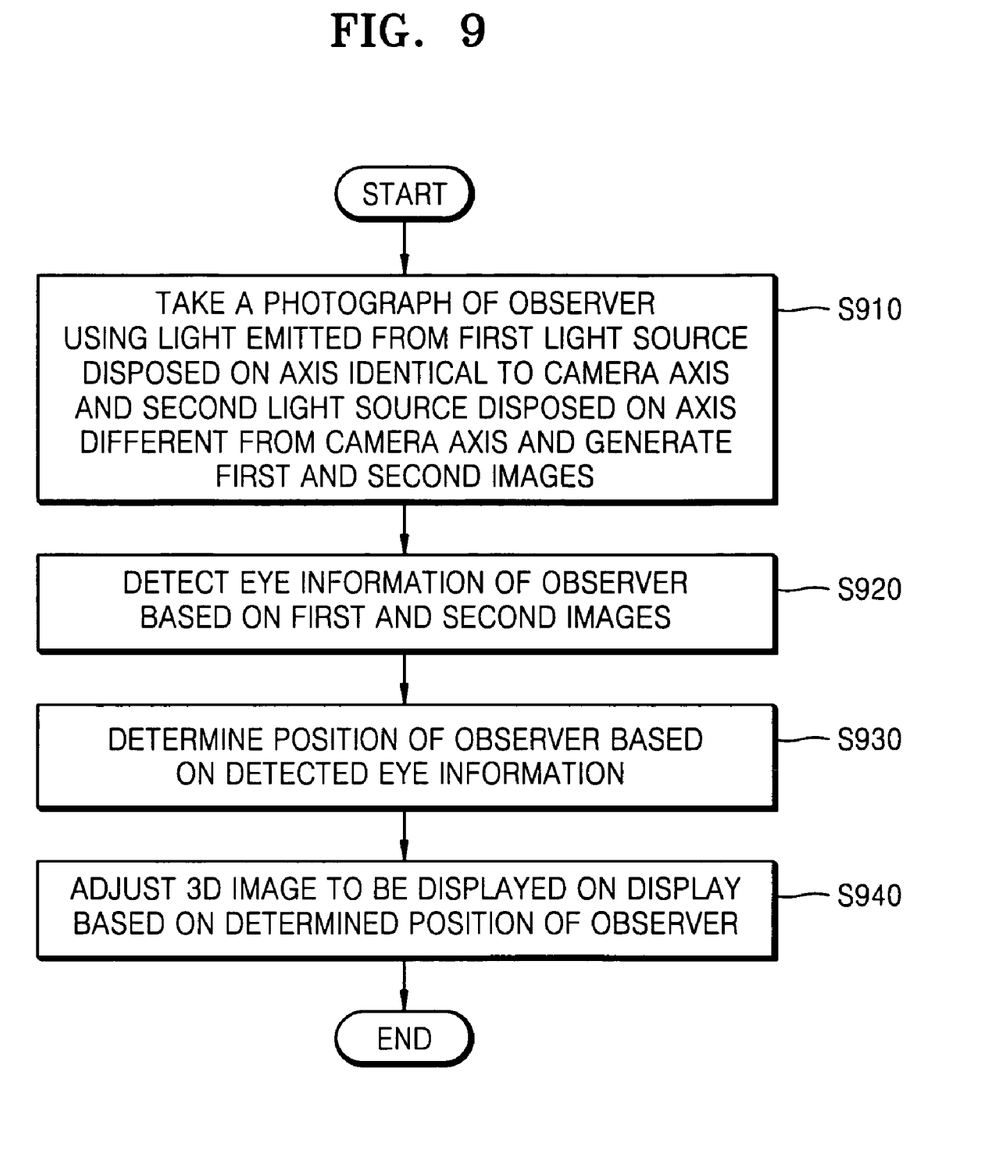
FIG. 9 is a flowchart illustrating a 3D image display method using detected eye information according to an exemplary embodiment of the present invention.

FIG. 9 is a flowchart illustrating a 3D image display method using detected eye information according to an embodiment of the present invention. Referring to FIG. 9, the photographing unit 410 takes a photograph of an observer using light emitted from the first light source 417 disposed on an axis identical to the camera axis and the second light source 419 disposed on an axis different from the camera axis and generates first and second images (operation S910). The first and second light sources 417 and 419 are alternately turned on, and the photographing unit 410 takes a photograph of the observer using light emitted from the first and second light sources 417 and 419 alternately turned on.

The eye information detection unit 420 detects eye information of the observer based on the first and second images (operation S920) and determines the position of the observer based on the detection eye information (operation S930). The eye information detection unit 420 may subtract the second image from the first image, generate a differential image between the first and second images, and detect the eye information of the observer based on the differential image. In addition, the eye information detection unit 420 may calculate the distance by which the observer deviates from the orthoscopic position at which the observer can perceive a 3D image based on the detected eye information and determine the position of the observer.

The 3D image adjustment unit 430 adjusts a 3D image, which will be displayed on the display, based on the determined position of the observer (operation S940). When the observer has moved from the orthoscopic position at which the observer can perceive a 3D image by the distance proportional to the distance between the observer's eye brows, the 3D image adjustment unit 430 may invert a 3D image for the left eye and a 3D image for the right eye, which will be displayed on the display. When the observer has moved from the orthoscopic position by the distance proportional to ½×n (n is a natural odd number) of the distance between the observer's eye brows, the 3D image adjustment unit 430 may shift the 3D optical plate 441.

Figure 10:
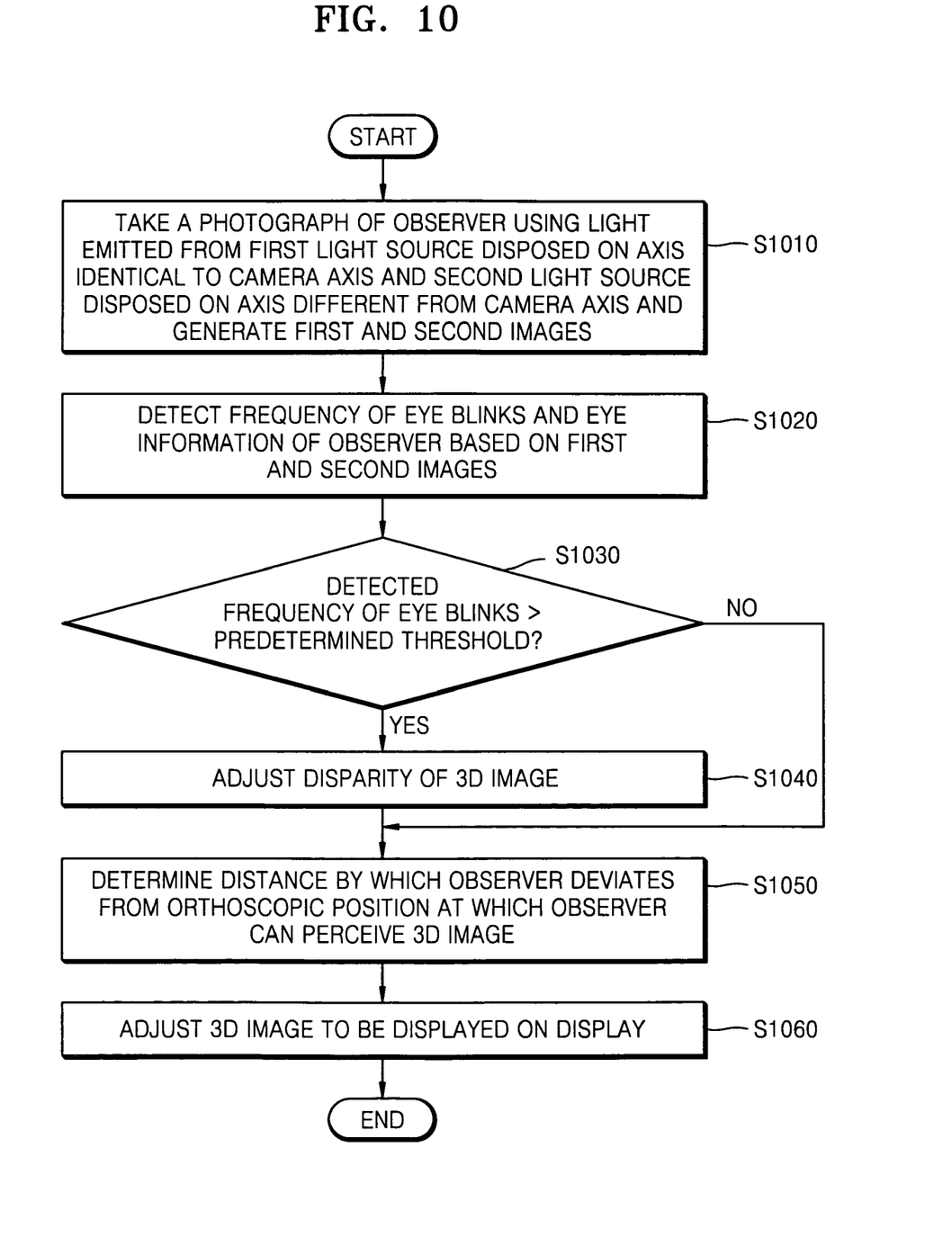
FIG. 10 is a flowchart illustrating a 3D image display method using detected eye information according to another exemplary embodiment of the present invention.

FIG. 10 is a flowchart illustrating a 3D image display method using detected eye information according to another embodiment of the present invention. Referring to FIG. 10, the photographing unit 410 takes a photograph of an observer using light emitted from the first light source 417 disposed on an axis identical to the camera axis and the second light source 419 disposed on an axis different from the camera axis and generates first and second images (operation S1010). The eye information detection unit 420 detects the eye information and frequency of eye blinks of the observer based on the first and second images (operation S1020).

The eye information detection unit 420 determines whether the frequency of eye blinks of the observer exceeds a predetermined threshold (operation S1030). When the eye information detection unit 420 determines that the frequency of eye blinks of the observer exceeds the predetermined threshold, the eye information detection unit 420 controls the disparity adjustment unit 440 to adjust a disparity of a 3D image (operation S1040). In addition, the eye information detection unit 420 determines the distance by which the observer deviates from the orthoscopic position at which the observer can properly perceive a 3D image (operation S1050). Then, the eye information detection unit 420 adjusts a 3D image to be displayed on the display by controlling the 3D image adjustment unit 430 to invert the 3D image or shifting the 3D optical plate 441 according to the determined distance (operation S1060).

The present invention can also be implemented as computer-readable code on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, and optical data storage devices.

The computer-readable recording medium can also be distributed over network-coupled computer systems so that the computer-readable code is stored and executed in a distributed fashion.

As described above, a 3D image display apparatus and method according to the exemplary embodiments of the present invention can adaptively display a 3D image even when even when the position of the head of an observer is changed after the observer moved. In addition, since two light sources and a differential image are used to determine the position of the observer, less calculation is required to determine the position of the observer than conventional methods, and the position of the observer can be more accurately determined. In this regard, the 3D image display apparatus can be easily applied to a digital television.

The 3D image apparatus and method according to the exemplary embodiment of the present invention can also reflect and thus reduce a degree of fatigue of an observer.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A three-dimensional (3D) image display apparatus comprising:
   a display;
   a photographing unit comprising:
      a camera having an optical axis,
      a first light source comprising one or more first lamps disposed such that a center of the first light source is disposed on the optical axis of the camera, and
      a second light source comprising one or more second lamps disposed such that a center of the second light source is separated from the optical axis of the camera,
      wherein the camera generates a first image of an observer using light emitted from the first light source, and generates a second image using light emitted from the second light source;
   an eye information detection unit which detects eye information of the observer based on the first and second images and determines a position of the observer based on the detected eye information; and
   a 3D image adjustment unit which adjusts a 3D image, which will be displayed on the a display, based on the determined position of the observer,
   wherein the eye information detection unit calculates a distance by which the observer deviates from an orthoscopic position at which the observer can perceive a 3D image based on the detected eye information and determines the position of the observer based on the calculated distance, and the 3D image adjustment unit adjusts the 3D image according to the calculated distance.

2. The apparatus of claim 1, wherein the photographing unit further comprises:
   a light source control unit which controls the first and second light sources to be alternately turned on at predetermined intervals.

3. The apparatus of claim 2, wherein each of the first and second light sources comprises an infrared generation unit.

4. The apparatus of claim 2, wherein the first light source comprises a plurality of first lamps disposed in a ring around a lens of the camera, and the second light source comprises a plurality of second lamps separated from the lens of the camera by a distance.

5. The apparatus of claim 1, wherein the eye information detection unit subtracts the second image from the first image, generates a differential image between the first and second images, and detects the eye information based on the differential image.

6. The apparatus of claim 1, wherein the 3D image adjustment unit comprises a 3D image inversion unit inverting a 3D image for the left eye and a 3D image for the right eye which will be displayed on the display, and the eye information detection unit controls the 3D image inversion unit to invert the 3D image for the left eye and the 3D image for the right eye if the eye information detection unit determines that the observer has moved from an orthoscopic position at which the observer can perceive a 3D image by a distance proportional to a distance between the observer's eyebrows.

7. The apparatus of claim 1,
   wherein the 3D image adjustment unit comprises a 3D optical plate driving unit which divides a 3D image into the first and second images and transmits the first and second images on different optical paths, and
   wherein the eye information detection unit controls the 3D optical plate driving unit to shift the 3D optical plate if the eye information detection unit determines that the observer has moved from an orthoscopic position at which the observer can perceive a 3D image by a distance proportional to one half of an odd number of the distance between the observer's eyebrows.

8. The apparatus of claim 7, wherein the 3D optical plate driving unit shifts the 3D optical plate by 0.5 pitch.

9. The apparatus of claim 1, wherein the eye information detection unit detects a frequency of eye blinks for a period of time, and the 3D image adjustment unit further comprises a disparity adjustment unit adjusting a disparity of a 3D image based on the detected frequency of eye blinks.

10. The apparatus of claim 9, wherein the eye information detection unit determines whether the detected frequency of eye blinks exceeds a threshold and controls the disparity adjustment unit to reduce the disparity of the 3D image if the eye information detection unit determines that the detected frequency of eye blinks exceeds the threshold.

11. The apparatus of claim 1, wherein the display comprises the 3D optical plate which divides the adjusted 3D image into the first and second images on different optical paths and transmits the first and second images.

12. The apparatus of claim 11, wherein the apparatus is a digital television.

13. A three-dimensional (3D) image display method comprising:
   illuminating an observer with a first light source and simultaneously using a camera to generate a first image of the observer using light emitted from the first light source, wherein the first light source comprises one or more first lamps disposed such that a center of the first light source is disposed on an optical axis of the camera;
   illuminating an observer with a second light source and simultaneously using the camera to generate a second image of the observer using light emitted from the second light source, wherein the second light source comprises one or more second lamps disposed such that a center of the second light source is separated from the optical axis of the camera;
   detecting eye information of the observer based on the first and second images;
   determining a position of the observer based on the detected eye information;
   adjusting a 3D image based on the determined position of the observer; and
   displaying the 3D image on a display,
   wherein determining the position of the observer comprises determining a distance by which the observer deviates from an orthoscopic position at which the observer can perceive a 3D image.

14. The method of claim 13, wherein the taking a photograph of the observer comprises:
   alternately turning on the first and second light sources at intervals; and
   using the camera to take photographs of the observer alternately using the light emitted from the first and second light sources.

15. The method of claim 13, wherein the detecting eye information comprises:
   subtracting the second image from the first image and generating a differential image between the first and second images; and
   detecting the eye information based on the differential image.

16. The method of claim 13, wherein adjusting the 3D image comprises:
   inverting a 3D image for the left eye and a 3D image for the right eye, which will be displayed on the display, or shifting a 3D optical plate dividing the 3D image into the first and second images on different optical paths, and transmitting the first and second images based on the determined distance.

17. The method of claim 16, further comprising,
   if it is determined that the observer has moved from the orthoscopic position at which the observer can perceive a 3D image by a distance proportional to a distance between the observer's eyebrows, inverting the 3D image for the left eye and the 3D image for the right eye, and,
   if it is determined that the observer has moved from the orthoscopic position at which the observer can perceive a 3D image by a distance proportional to one half of an odd number of the distance between the observer's eyebrows, shifting the 3D optical plate.

18. The method of claim 16, wherein, shifting the 3D optical plate, comprises shifting the 3D optical plate by 0.5 pitch.

19. The method of claim 13, wherein detecting the eye information further comprises:
   detecting a frequency of eye blinks for a predetermined period of time; and
   adjusting a disparity of a 3D image based on the detected frequency of eye blinks.

20. The method of claim 19,
   further comprising determining whether the detected frequency of eye blinks exceeds a threshold,
   wherein adjusting the 3D image comprises reducing the disparity of the 3D image when the detected frequency of eye blinks exceeds the threshold.

21. A non-transitory computer-readable recording medium on which a program adapted to enable a computer to perform a three dimensional (3D) image display method is recorded, the program enabling the computer to perform the operations of:
   illuminating an observer with a first light source and simultaneously using a camera to generate a first image of the observer using light emitted from the first light source, wherein the first light source comprises one or more first lamps disposed such that a center of the first light source is disposed on an optical axis of the camera;
   illuminating an observer with a second light source and simultaneously using the camera to generate a second image of the observer using light emitted from the second light source, wherein the second light source comprises one or more second lamps disposed such that a center of the second light source is separated from the optical axis of the camera;
   detecting eye information of the observer based on the first and second images;
   determining a position of the observer based on the detected eye information;
   adjusting a 3D image based on the determined position of the observer; and
   displaying the 3D image on a display,
   wherein determining the position of the observer comprises determining a distance by which the observer deviates from an orthoscopic position at which the observer can perceive a 3D image.

* * * * *